(12) United States Patent
Maegaki

(10) Patent No.: US 8,004,609 B2
(45) Date of Patent: Aug. 23, 2011

(54) AMPLIFIER, CORRECTING METHOD OF CORRECTING DIFFERENCE IN PROCESSING TIME BETWEEN VIDEO SIGNAL AND AUDIO SIGNAL, AND CORRECTING SYSTEM

(75) Inventor: Hirochika Maegaki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1307 days.

(21) Appl. No.: 11/597,283

(22) PCT Filed: May 26, 2005

(86) PCT No.: PCT/JP2005/009684
§ 371 (c)(1),
(2), (4) Date: Nov. 21, 2006

(87) PCT Pub. No.: WO2005/117427
PCT Pub. Date: Dec. 8, 2005

(65) Prior Publication Data
US 2008/0044160 A1      Feb. 21, 2008

(30) Foreign Application Priority Data
May 27, 2004   (JP) ................................ 2004-157745

(51) Int. Cl.
*H04N 9/475* (2006.01)
(52) U.S. Cl. .......................... 348/515; 348/512; 348/738
(58) Field of Classification Search .......... 348/515–518, 348/512, 180, 192, 194, 423.1; *H04N 9/475*
See application file for complete search history.

(56) References Cited

U.S. PATENT DOCUMENTS 4,963,967 A * 10/1990 Orland et al. ................. 348/484
6,906,755 B2 * 6/2005 Lundblad et al. ............. 348/515
(Continued)

FOREIGN PATENT DOCUMENTS
EP       0598295 A1      5/1994
(Continued)

OTHER PUBLICATIONS

Japanese Patent Office, "Notification of Reason for Refusal, Patent Application No. 2004-157745; Drafting Date: Feb. 4, 2010, 5 pages."

(Continued)

*Primary Examiner* — Trang U Tran
(74) *Attorney, Agent, or Firm* — Pillsbury Winthrop Shaw Pittman LLP

(57) ABSTRACT

There is provided an amplifier that measures a display delay time caused until a video is displayed actually after a video signal is generated, and sets automatically a delay time of an audio signal such that an audio synchronizes with this display. Test video data is stored in a memory 11. This test video data is video data that generates a clear change in luminance in such a manner that a screen is changed suddenly from deep black to pure white. This test video is output to a video display device 2 such as PDP, for example, and a delay time generated until the test video is displayed actually after this test video is output is measured. Since the luminance of the screen is changed suddenly when the test video is displayed actually, this change can be sensed by an optical sensor 20. The audio signal is delayed by setting this delay time in an audio signal processing portion 13, so that the video can synchronize with the audio.

16 Claims, 5 Drawing Sheets

U.S. PATENT DOCUMENTS 7,020,894 B1 * 3/2006 Godwin et al. ............... 725/135
7,212,248 B2 * 5/2007 Stanger ..................... 348/515

FOREIGN PATENT DOCUMENTS

| | | |
|---|---|---|
| JP | 05-219459 | 8/1993 |
| JP | 10-285483 | 10/1998 |
| JP | 11-308613 A | 11/1999 |
| JP | 2002-290767 A | 10/2002 |
| JP | 2005-101782 | 4/2005 |
| WO | WO 00/05901 | 2/2000 |

OTHER PUBLICATIONS

Supplementary European Search Report (No. EP05743714, Dated May 10, 2007; 4 pgs.).

Kirby & Marks: "A New Technique to Maintain Sound and Picture Synchronization", (Article No. XP000670474; Dated: Summer 1995, pp. 13-21).

* cited by examiner

AMPLIFIER, CORRECTING METHOD OF CORRECTING DIFFERENCE IN PROCESSING TIME BETWEEN VIDEO SIGNAL AND AUDIO SIGNAL, AND CORRECTING SYSTEM

TECHNICAL FIELD

The present invention relates to an amplifier, a correcting method, and a correcting system capable of correcting a difference between a video and an audio caused when an audio/video source is reproduced.

BACKGROUND ART

With the spread of high-definition television broadcasts and home theater systems, large-sized display devices such as PDP (Plasma Display Panel), DLP (Micromirror Projector), and the like have been put to practical use. However, the large-sized displays need the process of digitizing the input video signal into dot matrixes, and the like. Hence, a time lag (display delay time) caused until a video signal is actually displayed on a screen after the video signal is input is large, so that a delay of about 1 to 2 frame ($1/30$ to $1/15$ second) occurred.

In contrast, also the audio signal needs a predetermined time in the process, e.g., the process of expanding the compressed digital signal and then converting the expanded digital signal into the analog signal, or the like, but such predetermined time is not so large as a time lag caused in displaying the video. Therefore, there existed such a problem that, when the video and the audio are reproduced as they are, the video does not synchronize with the audio because a time lag of the video is large.

Meanwhile, the technology to sense a difference in processing times in the audio/video signal processing system has been proposed (Patent Literature 1, for example). In this technology of this Patent Literature 1, a difference in processing times is measured in such a manner that the input audio/video signal in which a change in luminance and a change in sound volume occur simultaneously is processed through separate systems and then a difference between a changing timing of the sound volume of the audio signal being output after the process is ended and a changing timing of the luminance of the video signal is measured.

Patent Literature 1: JP-A-10-285483

As described above, the technology to sense a difference between a processing time of the video signal and a processing time of the audio signal in the transmission line (signal processing circuit) is disclosed in Patent Literature 1. But this Literature merely discloses the measuring technology and does not disclose the technology to measure automatically the difference and correct automatically such difference. As a result, the technology in this Literature could not be applied to the audio/video amplifier that the ordinary user employs.

DISCLOSURE OF THE INVENTION

It is an object of the present invention to provide an amplifier, a correcting method, and a correcting system, which are capable of correcting a difference between a processing time of a video signal and a processing time of an audio signal by measuring automatically a display delay time.

In order to achieve the above object, the present invention is characterized by following configurations.

(1) An amplifier to which at least an audio signal of an audio signal and a video signal is input and which reproduces the inputted audio signal, includes an audio processing portion for executing a reproducing process of the inputted audio signal; a test video generating portion for generating a test video signal and transmitting the test video signal to a video display device; a sensing portion for sensing a change in test video, which is generated based on the test video signal and displayed on the video display device; and a controlling portion for sensing a time required until the sensing portion senses a change in a video being displayed on the video display device after the test video generating portion generates the test video signal as a delay time of the video, and then delaying a reproduction of the audio signal based on the sensed delay time of the video.

(2) In the amplifier according to (1), the controlling portion calculates an audio delay time, which is a time to delay the reproduction of the audio signal, based on the delay time of the video, and sets the audio delay time in the audio processing portion.

(3) In the amplifier according to (2), the audio processing portion has a buffer memory to store the audio signal, and the controlling portion controls the audio delay time by controlling a buffered amount of the audio signal to be stored in the buffer.

(4) In the amplifier according to (2), the audio processing portion senses a type of the audio signal, the controlling portion has a memory portion that stores the audio delay time every type of the audio signal, and the controlling portion reads a corresponding audio delay time stored in the memory portion based on the type of the audio signal, and sets the audio delay time in the audio processing portion.

(5) In the amplifier according to (2), the controlling portion has a memory portion that stores a decode processing time that is a time necessary for a decoding process of the audio signal, and the controlling portion calculates the audio delay time based on the delay time of the video and the decode processing time.

(6) An amplifier to which at least an audio signal of an audio signal and a video signal is input and which reproduces the inputted audio signal, includes an audio processing portion for executing a reproducing process of the inputted audio signal; a test audio signal generating portion for a generating a test audio signal; a test video signal generating portion for generating a test video signal in synchronism with generation of the test audio signal, and then transmitting the test video signal to a video display device; a video sensing portion for sensing a change in video, which is generated based on the test video signal and displayed on the video display device; a content sensing portion for sensing a change in type or content of the test audio signal; and a controlling portion for sensing a time required until the video sensing portion senses a change in the video being displayed on the video display device after the content sensing portion senses the change in type or content of the test audio signal as a delay time of the video, then calculating an audio delay time, which is a time to delay the reproduction of the audio signal, based on the sensed delay time of the video, and then setting the audio delay time in the audio processing portion.

(7) In the amplifier according to (6), the audio processing portion has a buffer memory to store the audio signal, and the controlling portion controls the audio delay time by controlling a buffered amount of the audio signal to be stored in the buffer.

(8) In the amplifier according to (6), the audio processing portion senses a type of the audio signal, the controlling portion has a memory portion that stores the audio delay time every type of the audio signal, and the controlling portion reads a corresponding audio delay time stored in the memory portion based on the type of the audio signal, and sets the audio delay time in the audio processing portion.

(9) In the amplifier according to (6), the controlling portion has a memory portion that stores a decode processing time that is a time necessary for a decoding process of the audio signal, and the controlling portion calculates the audio delay time based on the delay time of the video and the decode processing time.

(10) A correcting method of correcting a difference between a processing time of a video signal and a processing time of an audio signal, includes a step of generating a test video signal; a step of displaying the test video signal on a video display device; a step of sensing a change in video, which is generated based on the test video signal and displayed on the video display device; a step of sensing a time required until a change in a video being displayed on the video display device is sensed after the test video signal is generated as a delay time of the video; and a step of delaying a reproduction of the audio signal based on the delay time of the video.

(11) In the correcting method according to (10), an amount of delay to delay the reproduction of the audio signal is controlled by controlling a buffered amount of the audio signal stored in a buffer.

(12) The correcting method according to (10) further includes: a step of sensing a type of the audio signal; and a step of reading a corresponding audio delay time stored in a memory portion based on the type of the audio signal, and then delaying the reproduction of the audio signal based on the delay time of the video.

(13) The correcting method according to (10) further includes: a step of calculating an audio delay time that is a time to delay the reproduction of the audio signal, based on the delay time of the video and a decode processing time required for a decoding process of the audio signal.

(14) A correcting method of correcting a difference between a processing time of a video signal and a processing time of an audio signal, includes a step of generating a test audio signal; a step of generating a test video signal in synchronism with a generation of the test audio signal; a step of displaying the test video signal on a video display device; a step of sensing a change in video, which is generated based on the test video signal and displayed on the video display device; a step of sensing a time required until a change in the video being displayed on the video display device is sensed after a change in type or content of the audio signal is sensed as a delay time of the video; a step of calculating an audio delay time that is a time to delay a reproduction of the audio signal, based on the delay time of the video; a step of setting the audio delay time; and a step of executing a reproducing process of the inputted audio signal based on the set audio delay time.

(15) In the correcting method according to (14), an amount of delay to delay the reproduction of the audio signal is controlled by controlling a buffered amount of the audio signal stored in a buffer.

(16) The correcting method according to (14) further includes: a step of sensing a type of the audio signal; a step of reading a corresponding audio delay time stored in a memory portion based on the type of the audio signal; and a step of setting the read audio delay time.

(17) The correcting method according to (14) further includes: a step of calculating the audio delay time based on the delay time of the video and a decode processing time required for a decoding process of the audio signal.

(18) A correcting system for correcting a difference between a processing time of a video signal and a processing time of an audio signal, includes an audio processing portion for executing a reproducing process of the audio signal; a test video signal generating portion for generating a test video signal; a video displaying portion for displaying the test video signal; a video sensing portion for sensing a change in video, which is generated based on the test video signal and displayed on the video display portion; and a controlling portion for sensing a time required until the video sensing portion senses a change in the video being displayed on the video display device after the test video generating portion generates the test video signal as a delay time of the video, and then delaying a reproduction of the audio signal based on the delay time of the video.

(19) In the correcting system according to (18), the controlling portion calculates the audio delay time that is a time to delay the audio signal based on the sensed delay time of the video and a decode processing time required for a decoding process of the audio signal, and then sets the audio delay time in the audio processing portion.

(20) A correcting system for correcting a difference between a processing time of a video signal and a processing time of an audio signal, includes an audio processing portion for executing a reproducing process of the inputted audio signal; a test audio signal generating portion for generating a test audio signal; a test video signal generating portion for generating a test video signal in synchronism with a generation of the test audio signal; a video displaying portion for displaying the test video signal; a video sensing portion for sensing a change in video, which is generated based on the test video signal and displayed on the video display portion; a content sensing portion for sensing a change in type or content of the test audio signal; a sensing portion for sensing a time required until the video sensing portion senses a change in the video after the content sensing portion senses the change in type or content of the test audio signal as a delay time of the video; a calculating portion for calculating an audio delay time that is a time to delay the reproduction of the audio signal, based on the sensed delay time of the video; and a setting portion for setting the audio delay time in the audio processing portion.

(21) In the correcting system according to (20), the calculating portion calculates the audio delay time based on the delay time of the video and a decode processing time required for a decoding process of the audio signal.

In the present invention, for example, the luminance may be changed as a change of the video. In this case, a sensor such as a phototransistor, or the like for sensing the brightness may be provided in vicinity of the screen of the video display device as the video sensing portion. Also, a change in color, or the like may be sensed. The type of the audio signal is a format of the audio signal, or the like. For example, there are PCM, DTS (trademark), Dolby (trademark), and the like. Also, a change of the contents of the audio signal is a change in sound level from a soundless condition to a predetermined sound level, a change in frequency from a first frequency to a second frequency, or the like.

In the present invention, the reason why the audio signal is also input simultaneously when the test video signal (test video) is input from the external device is that, because the video signal is input as the analog signal (e.g., the component signal) in the ordinary AV amplifier, a special processing circuit is needed to sense a change of the contents whereas, because the audio signal is input as the digital signal, the type of the signal, or the like can be sensed by the original function of the digital signal processing circuit and thus the sensing of the audio signal is easy.

As described above, according to the present invention, the delay time generated until the video is actually displayed after the video signal is reproduced can be sensed, and the audio delay time to delay the audio signal can be set automatically to overcome a difference caused by this delay time. Therefore, even when the video display device having a long display delay time is employed, the audio/video signal can be reproduced in such a situation that the video synchronizes with the audio.

BRIEF DESCRIPTION OF THE DRAWINGS

The objects and advantages of the present invention will become obvious from the description given below in the detailed explanation of the preferred embodiments with reference to the accompanying drawings FIG. 1 A block diagram of an AV amplifier according to a first embodiment of the present invention.

BEST MODE FOR CARRYING OUT THE INVENTION

Figure 1:
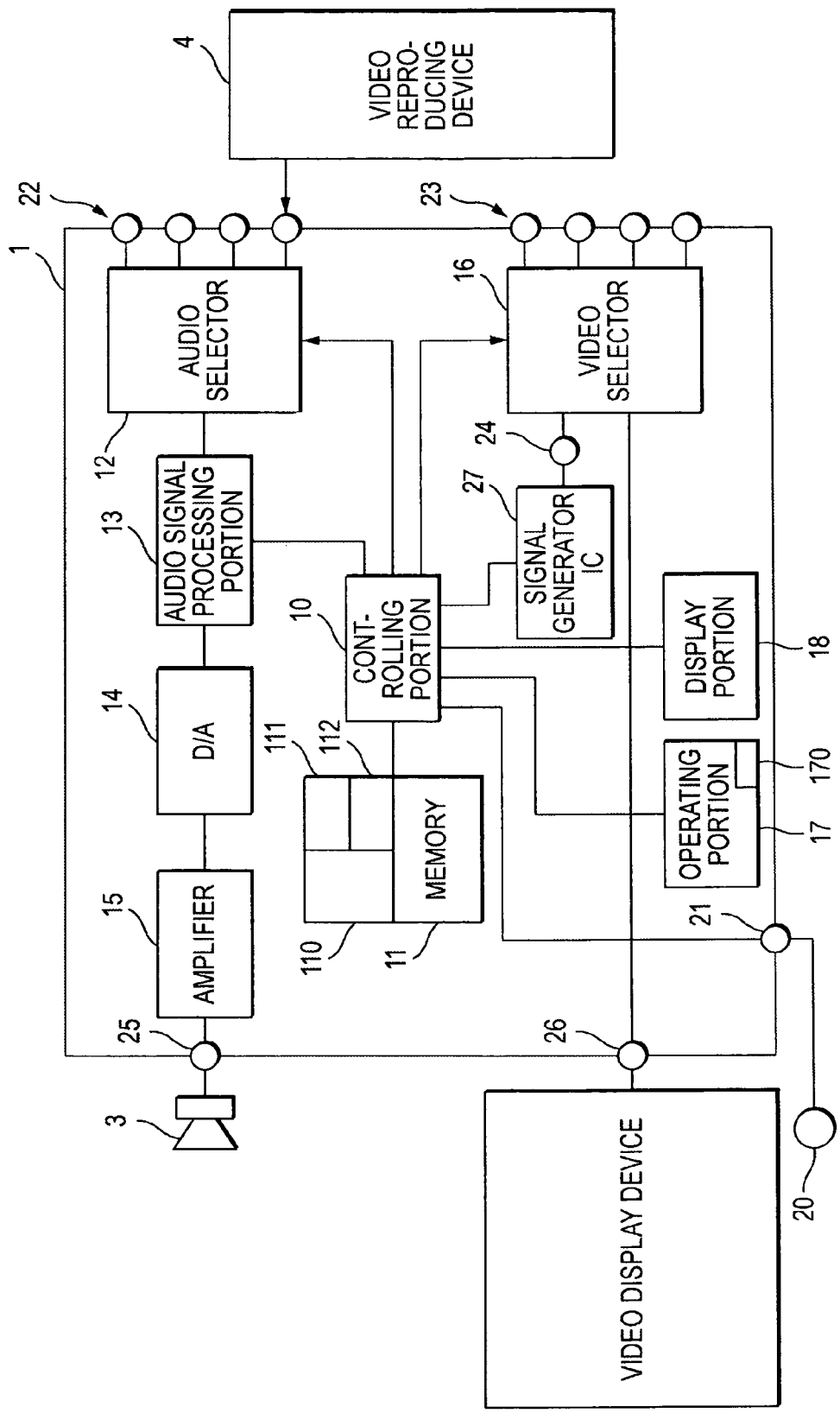
Figure 2:
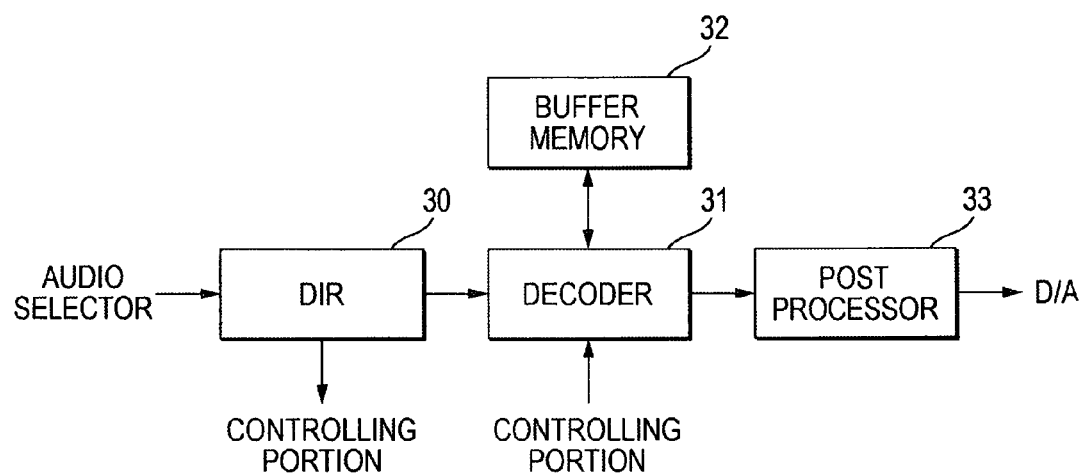
FIG. 2 A block diagram of an audio signal processing portion of the AV amplifier.

FIG. 1 is a block diagram of an AV (audio/video) amplifier according to a first embodiment of the present invention. FIG. 2 is a configurative view of an audio signal processing portion of the same AV amplifier.

This AV amplifier 1 has plural (four) audio input terminals 22 and plural (four) video input terminals 23, and any one of them is selected by an audio selector 12 and a video selector 16 respectively. The audio selector 12 and the video selector 16 are switched based on a signal from a controlling portion 10.

A video reproducing device 4 such as a DVD player, or the like is connected to the audio input terminals 22 and the video input terminals 23.

A video signal selected by the video selector 16 is input into a video display device 2 via a video output terminal 26. The video display device 2 is PDP (Plasma Display Panel), DLP (Micromirror Projector), or the like.

The video selector 16 has a test video input terminal 24 in the inside, in addition to four external video input terminals 23. A signal generator IC 27 for generating a video signal of the test video is connected to this test video input terminal 24. In a test mode using the test video, an input of the video selector 16 is switched to the test video input terminal 24. At this time, the signal generator IC 27 generates a test video (test video signal) in response to the instruction of the controlling portion 10, and then this test video is output to the video display device 2 via the video selector 16.

In the first embodiment shown in FIG. 1, the test video input terminal 24 is provided to the video selector 16 and then the signal generator IC 27 is connected to this test video input terminal 24. In this case, the signal generator IC 27 may be connected to the output side of the video selector 16, and then the signal generator IC 27 may be operated either to pass the input video signal through in the normal mode or to cut off the signal from the video selector 16 and output the self-generated test video to the video display device side in the test mode.

Here, the "test mode" is a mode in which a time lag (display delay time) until the video signal is actually displayed after such video signal is input into the video display device 2 is measured. In this measurement, a first test mode using the test video that is reproduced by the controlling portion 10 and a second test mode using the video signal that is input from the external device (the video reproducing device 4) via the video input terminals 23 are applied. The first test mode or the second test mode is set a predetermined operation made by the user.

The audio signal selected by the audio selector 12 is input into an audio signal processing portion 13. The audio signal processing portion 13 is constructed as shown in FIG. 2. A DIR (Digital Interface Receiver) 30 controls the input of the audio signal and also senses the type (PCM, DTS, Dolby, or the like) of the inputted audio signal. The sensed type of the audio signal is transmitted to the controlling portion 10.

A decoder 31 converts the inputted audio signal into a linear PCM signal. Also, the decoder 31 has a buffer memory 32, and buffers the inputted audio signal once in the buffer memory 32 to execute the decoding process. A delay time of the audio signal is decided depending on how much the audio signal should be buffered in the buffer memory 32. In this AV amplifier, the synchronization between the actually displayed video and the actually output audio is established by controlling a buffered amount. The controlling portion 10 decides a buffered amount and informs the decoder 31 of it. Effects such as reverberation, and the like are given to the decoded audio signal by a post processor 33.

In FIG. 2, the buffer memory 32 is connected to the decoder 31, but the buffer memory 32 may be connected to the DIR 30 or the post processor 33. Also, the buffer memory may be constructed as an internal memory of the decoder 31 or the post processor 33.

The audio signal to which various effects are given by the post processor 33 is output to a D/A converter 14 in the subsequent stage. The audio signal is converted into the analog signal by the D/A converter 14, then amplified by an amplifier 15, and then output to a speaker 3 via a speaker terminal 25. The amplifier 15 includes an electronic volume, and controls a sound volume of the audio signal based on a volume control signal being input from the controlling portion 10.

The controlling portion 10 is composed of a microcomputer having a memory 11. Test video data 110 described later, decode processing times 111 required for respective types of the audio signals, etc. as well as programs used to control an operation of this AV amplifier 1 are stored in the memory 11. The test video data gives a video that can generate a clear change of luminance on a screen that is changed from deep black to pure white, for example. The test video data may be stored as digital video data, or may be stored as OSD (On-Screen Display) control data used to display characters, etc. on a screen.

Also, a delay time memory area 112 is set in the memory 11. This delay time memory area 112 stores a display delay time of the video display device 2 and an audio delay control time for each type of the audio signal, which is calculated by subtracting the decode processing time from the display delay time.

The controlling portion 10 informs the decoder 31 of the audio delay control time corresponding to the type of the audio signal at that time. The decoder 31 buffers the data corresponding to the informed audio delay control time in the buffer memory 32. Accordingly, the audio signal is delayed by the audio delay control time (buffered amount)+the decode processing time, i.e., the display delay time, so that a lag in the display agrees with a lag in the audio and thus the video signal synchronizes with the audio signal.

Also, in addition to the audio selector 12, the video selector 16, the audio signal processing portion 13, and the amplifier 15, an operating portion 17, a display portion 18, and an optical sensor 20 via a sensor connection terminal 21 are connected to the controlling portion 10. The operating portion 17 has a selector switch for switching the AV source, a volume switch for adjusting a volume, a mode changing switch 170 for switching the normal operation mode and the (first or second) test mode, and the like together with a power supply switch that turns ON/OFF a power of the amplifier. Also, the AV source, the volume value, the mode, etc., which are selected currently, are displayed on the display portion 18.

The mode changing switch 170 may be composed of a button switch, or the like, for example. In this case, the controlling portion 10 may act to change the mode in the order of normal mode, first test mode, second test mode, and normal mode every time when the button is turned ON.

The optical sensor 20 is a sensor that is directed toward the video display device 2 and has a function of sensing at least a change in luminance of the display screen of the video display device 2. A sensed value of the optical sensor 20 is input into the controlling portion 10 via the sensor terminal 21.

Figure 3:
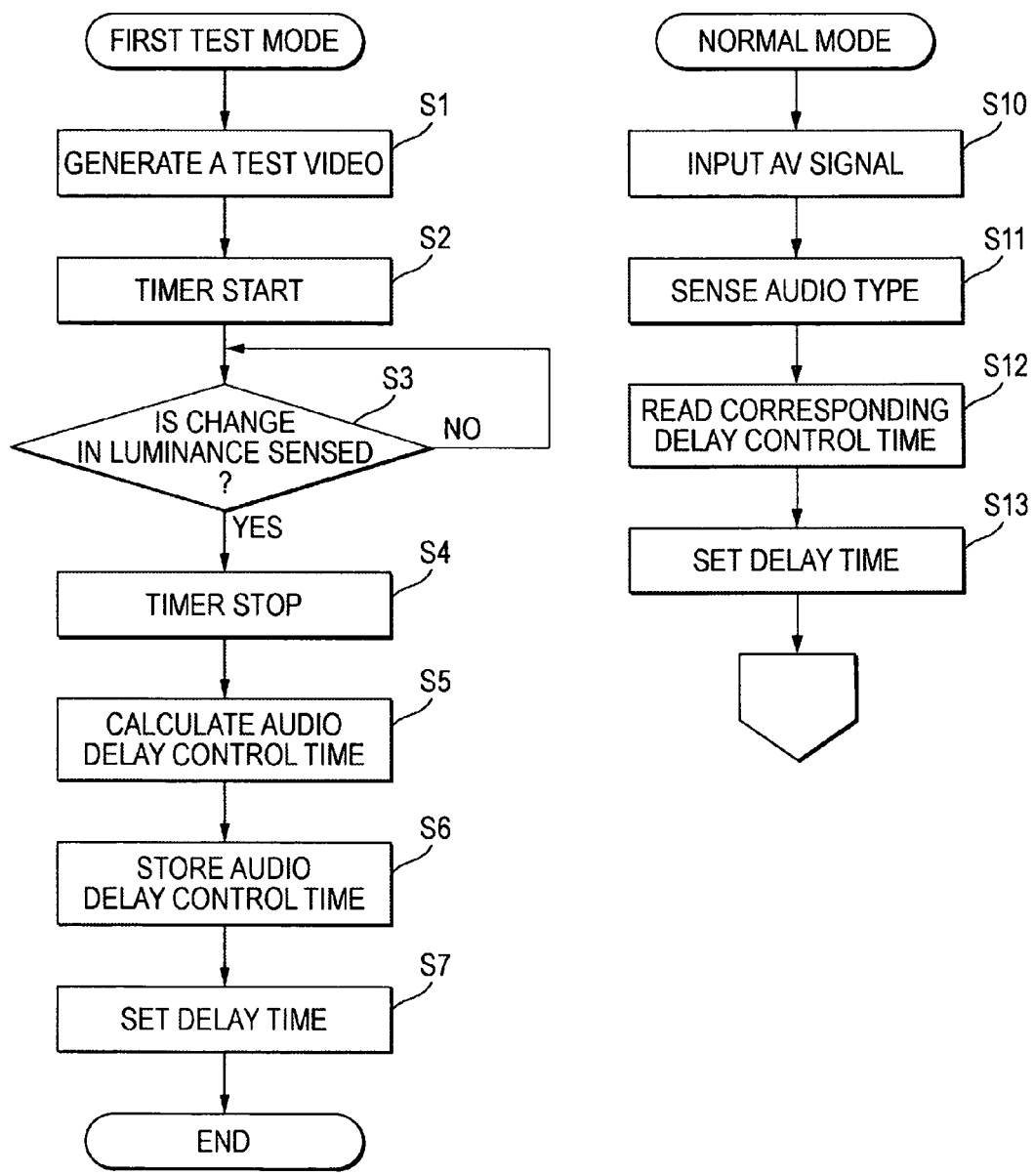
FIG. 3 A flowchart showing an operation of the AV amplifier.
Figure 4:
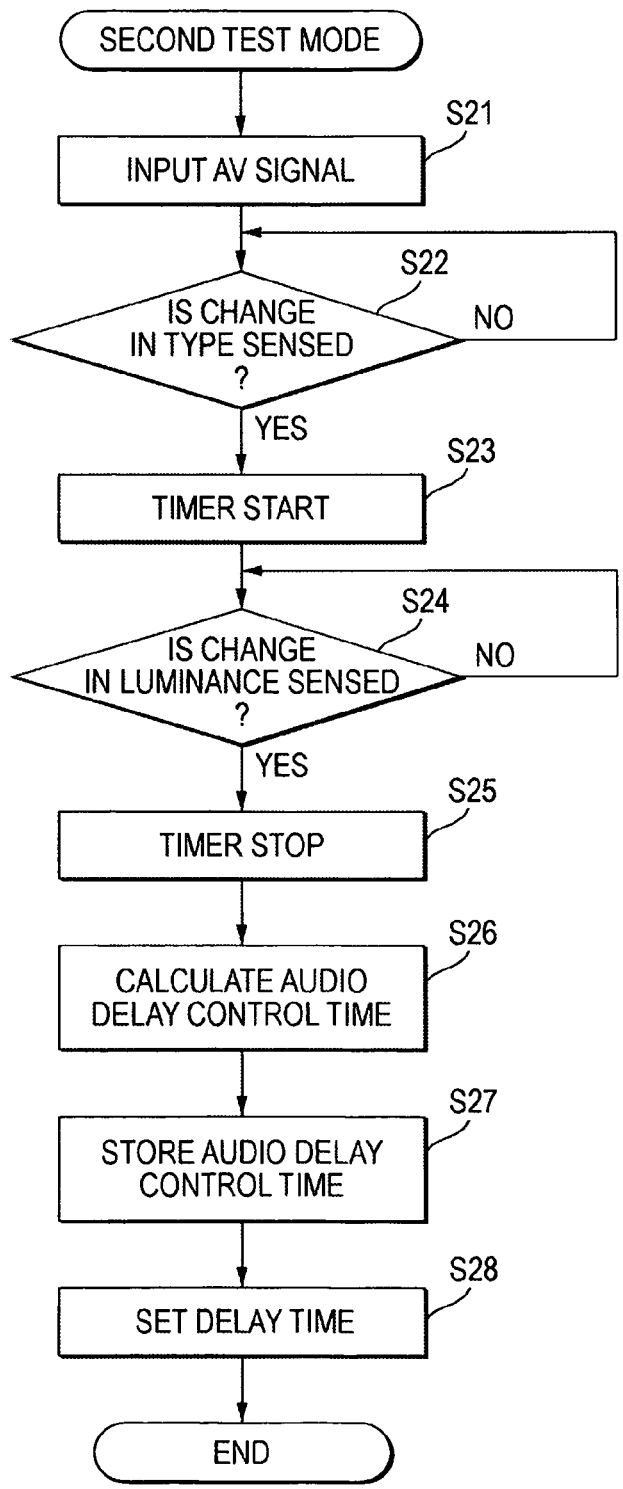
FIG. 4 A flowchart showing an operation of the AV amplifier.

FIGS. 3 and 4 are flowcharts showing an operation of the AV amplifier in test modes. The left portion of FIG. 3 shows an operation in the first test mode, and FIG. 4 shows an operation in the second test mode. The right portion of FIG. 3 shows an operation taken to set the audio delay control time being calculated in the test mode in the decoder 31.

In the left portion of FIG. 3, in the first test mode, first the test video data 110 stored in the memory 11 is reproduced (S1), and the timer is started at the same time (S2). A soft timer by which the controlling portion 10 counts a time based on an internal clock is used as this timer. Then, the controlling portion 10 monitors the optical sensor 20. Then, when the optical sensor 20 senses a change in luminance of the screen of the video display device 2 (S3), the controlling portion 10 stops the timer (S4). This count value of the timer corresponds to the display delay time of the video display device 2. Then, the controlling portion 10 calculates the audio delay control time by subtracting the decode processing time of the audio signal from this measured display delay time (S5). This audio delay control time is calculated every type of the audio signal. Then, the controlling portion 10 stores the measured display delay time and the calculated audio delay control time in the delay time memory area 112 (S6).

Then, the controlling portion 10 sets this audio delay control time in the decoder 31 of the audio signal processing portion 13 (S7). The audio delay control time is different every type of the audio signal, as described above. Here, the audio delay control time in the typical type (e.g., DTS) of the audio signal is set by way of example.

The right portion of FIG. 3 is a flowchart showing the operation in the normal mode when the AV source is input from the external device. First the AV signal is input (S10). Then, the DIR (Digital Interface Receiver) 30 senses the type of the audio signal (S11). This type is transmitted from the DIR 30 (the audio signal processing portion 13) to the controlling portion 10. Then, the controlling portion 10 reads the audio delay control time corresponding to this type from the delay time memory area 112 (S12). Then, the controlling portion 10 sets this audio delay control time in the decoder 31 of the audio signal processing portion 13 (S13). The decoder 31 outputs the audio signal while delaying this audio signal by this set audio delay control time in addition to a time necessary for the decoding, so that a timing of the video coincides with a timing of the audio.

In the operation in the second test mode in FIG. 4, the test video is generated when the video reproducing device 4 such as the DVD player, or the like reproduces the media (the DVD disk, or the like) dedicated to the test mode. This test mode dedicated video is a video in which an exact change in luminance occurs, e.g., the overall screen is changed suddenly from deep black to pure white, and the type or contents of the audio signal is changed in synchronism with a changing timing of the luminance of the video signal. When the type (PCM, DTS, Dolby, or the like) of the audio signal is changed, the DIR 30 of the audio signal processing portion 13 senses this change immediately and then informs the controlling portion 10 of this change. As a result, the controlling portion 10 can use this sensed timing as a timing at which the test video is generated. Also, when the contents of the audio signal such as the sound volume value, or the like is changed, the controlling portion 10 can sense this change by causing the decoder 31 to monitor this change.

First, the test audio/video signal is input (S21). Then, the controlling portion 10 monitors whether or not the type or contents of the audio signal is changed (S22). If the type or contents of the audio signal is changed (S22), the controlling portion 10 starts the timer because it decides that a timing at which the luminance of the video signal being input in synchronism with the audio signal is changed is sensed (S23). Then, the controlling portion 10 monitors the optical sensor 20. Then, when the optical sensor 20 senses a change in luminance of the screen of the video display device 2 (S24), the controlling portion 10 stops the timer (S25). This count value of the timer gives the display delay time of the video display device 2. Then, the controlling portion 10 calculates the audio delay control time by subtracting the decode processing time of the audio signal from this measured display delay time (S26). This audio delay control time is calculated every type of the audio signal. Then, the controlling portion 10 stores the measured display delay time and the calculated audio delay control time in the delay time memory area 112 (S27).

Then, the controlling portion 10 sets the audio delay control time in the decoder 31 of the audio signal processing portion 13 (S28). As described above, the audio delay control time is different every type of the audio signal. However, if differences in the audio delay control times for respective types of the videos are stored previously in the controlling portion 10, delay control times of remaining types of the videos can be decided by calculating the audio delay control time of one type signal (e.g., DTS).

In the second test mode in FIG. 4, the controlling portion 10 causes the video reproducing device 4 to play the special-purpose disk. But the display delay time may be measured by playing the ordinary media (on which a movie, or the like is recorded).

In the second test mode, since a difference is measured by using the audio signal as a trigger, the display audio time can be measured while taking account of both the display delay of the video display device 2 and the time lag of the video signal from the audio signal output from the video reproducing device 4.

In the first embodiment, the audio delay control time is calculated by subtracting the decode processing time from the display delay time. In this case, since the decode processing time is sufficiently short rather than the display delay time, the display delay time can be set as the audio delay control time as it is without calculation.

Figure 5:
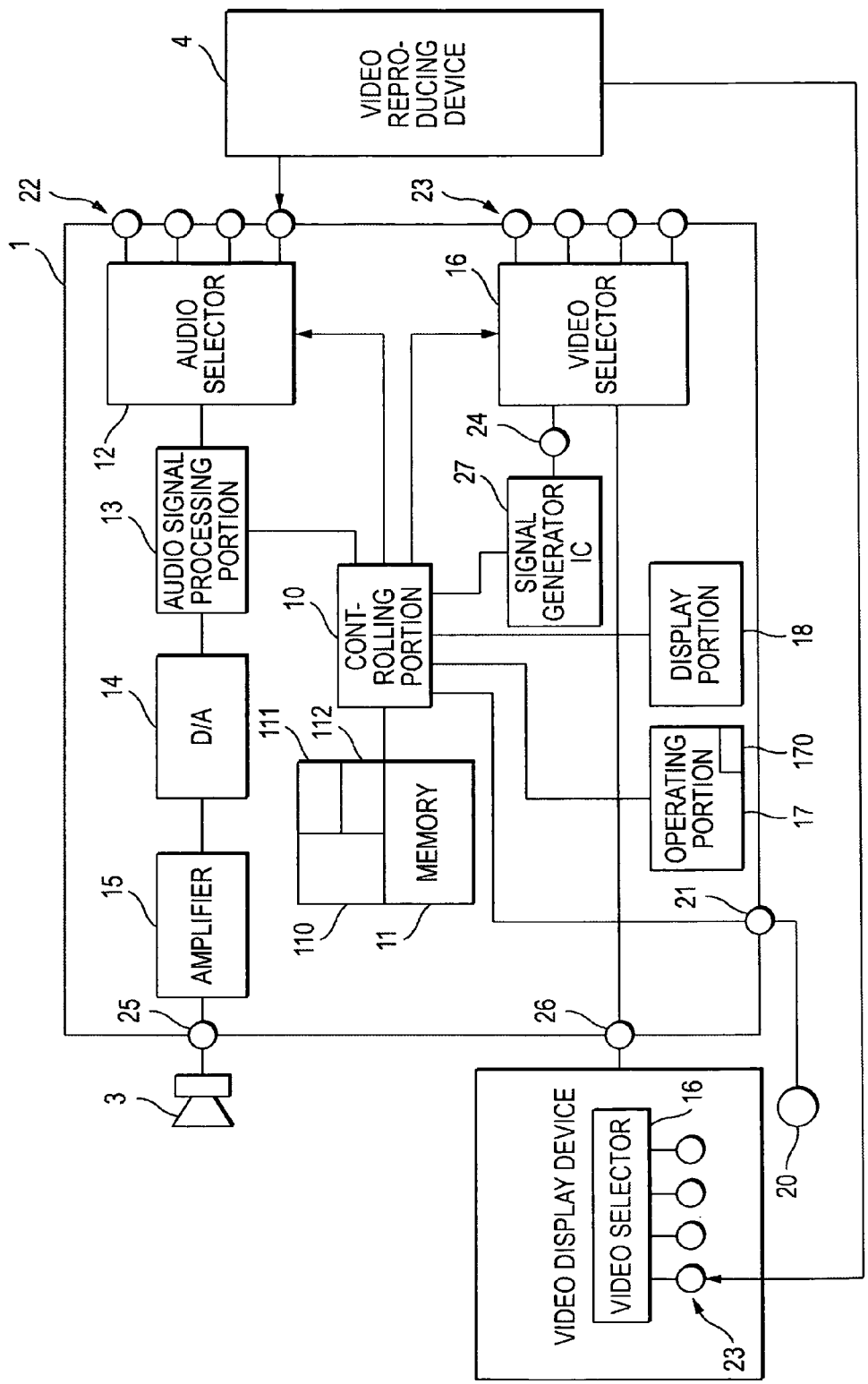
FIG. 5 A block diagram of an AV amplifier according to a second embodiment of the present invention.

Next, a second embodiment of the present invention will be explained with reference to FIG. 5 hereunder. FIG. 5 is a block diagram of an AV amplifier according to the second embodiment. This system in FIG. 5 is different from the AV amplifier system shown in FIG. 1 in that the video selector 16 and the video input terminals 23 are provided to not the AV amplifier 1 but the video display device 2. In this case, the constituent elements in the block diagram in FIG. 5 are almost similar to those in the block diagram in FIG. 1. Therefore, the same reference symbols are affixed to the same constituent elements and their explanation will be omitted herein.

In the second embodiment, in the first test mode, the test video that the controlling portion 10 reproduces is employed like the first embodiment. In the normal mode, the video reproduced signal is directly input from the video reproducing device into the video input terminals 23 of the video display device. Also, in the second test mode, the video signal being input from the external device (the video reproducing device 4) via the video input terminals 23 is employed. This video signal is input in synchronism with the input of the test audio signal being input from the external device (the video reproducing device 4).

The present invention is explained in detail with reference to the particular embodiments. But it is apparent for those skilled in the art that various variations and modifications can be applied without departing from a spirit and a scope of the present invention.

This application is based upon Japanese Patent Application No. 2004-157745 filed on May 27, 2004; the contents of which are incorporated herein by reference.

INDUSTRIAL APPLICABILITY

According to the present invention, the delay time generated until the video is actually displayed after the video signal is reproduced can be sensed, and the audio delay time to delay the audio signal can be set automatically to overcome a difference caused by this delay time. Therefore, even when the video display device having a long display delay time is employed, the audio/video signal can be reproduced in such a situation that the video synchronizes with the audio.

The invention claimed is:

1. An amplifier to which at least an audio signal associated with a video signal is input and which reproduces the inputted audio signal, comprising:
    an audio processing portion that executes a reproducing process of the inputted audio signal;
    a test video generating portion that generates a test video signal and transmits the test video signal to a video display device;
    a sensing portion that senses a change in test video, which is generated based on the test video signal and displayed on the video display device; and
    a controlling portion that senses a time required from when the test video generating portion generates the test video signal until the sensing portion senses a change in a video being displayed on the video display device as a delay time of the video, and delays a reproduction of the audio signal based on the sensed delay time of the video, wherein
    the controlling portion calculates an audio delay time, which is a time to delay the reproduction of the audio signal, based on the delay time of the video, and sets the audio delay time in the audio processing portion;
    the audio processing portion senses a type of the audio signal;
    the controlling portion has a memory portion which stores the audio delay time for every type of the audio signal; and
    the controlling portion reads a corresponding audio delay time stored in the memory portion based on the type of the audio signal, and sets the audio delay time in the audio processing portion.

2. The amplifier according to claim 1, wherein the audio processing portion has a buffer memory to store the audio signal, and the controlling portion controls the audio delay time by controlling a buffered amount of the audio signal to be stored in the buffer.

3. The amplifier according to claim 1, wherein the controlling portion has a memory portion which stores a decode processing time that is a time necessary for a decoding process of the audio signal; and
    wherein the controlling portion calculates the audio delay time based on the delay time of the video and the decode processing time.

4. An amplifier to which at least an audio signal associated with a video signal is input and which reproduces the inputted audio signal, comprising:
    an audio processing portion that executes a reproducing process of the inputted audio signal;
    a test audio signal generating portion that generates a test audio signal;
    a test video signal generating portion that generates a test video signal in synchronism with generation of the test audio signal, and transmits the test video signal to a video display device;
    a video sensing portion that senses a change in video, which is generated based on the test video signal and displayed on the video display device;
    a content sensing portion that senses a change in type or content of the test audio signal; and
    a controlling portion that senses a time required from when the content sensing portion senses the change in type or content of the test audio signal until the video sensing portion senses a change in the video being displayed on the video display device as a delay time of the video, calculates an audio delay time, which is a time to delay the reproduction of the audio signal, based on the sensed delay time of the video, and sets the audio delay time in the audio processing portion, wherein
    the audio processing portion senses a type of the audio signal;
    the controlling portion has a memory portion which stores the audio delay time for every type of the audio signal; and
    the controlling portion reads a corresponding audio delay time stored in the memory portion based on the type of the audio signal, and sets the audio delay time in the audio processing portion.

5. The amplifier according to claim 4, wherein the audio processing portion has a buffer memory to store the audio signal; and
    wherein the controlling portion controls the audio delay time by controlling a buffered amount of the audio signal to be stored in the buffer.

6. The amplifier according to claim 4, wherein the controlling portion has a memory portion which stores a decode processing time that is a time necessary for a decoding process of the audio signal; and
    wherein the controlling portion calculates the audio delay time based on the delay time of the video and the decode processing time.

7. A correcting method of correcting a difference between a processing time of a video signal and a processing time of an audio signal, comprising the steps of:
    generating a test video signal;
    displaying the test video signal on a video display device;
    sensing a change in video, which is generated based on the test video signal and displayed on the video display device;

sensing a time required from when the test video signal is generated until a change in a video being displayed on the video display device is sensed as a delay time of the video;

sensing a type of the audio signal; and reading a corresponding audio delay time stored in a memory portion based on the type of the audio signal, and delaying the reproduction of the audio signal based on the delay time of the video.

8. The correcting method according to claim 7, wherein an amount of delay to delay the reproduction of the audio signal is controlled by controlling a buffered amount of the audio signal stored in a buffer.

9. The correcting method according to claim 7, further comprising a step of calculating an audio delay time that is a time to delay the reproduction of the audio signal, based on the delay time of the video and a decode processing time required for a decoding process of the audio signal.

10. A correcting method of correcting a difference between a processing time of a video signal and a processing time of an audio signal, comprising the steps of:

generating a test audio signal;

generating a test video signal in synchronism with a generation of the test audio signal;

displaying the test video signal on a video display device;

sensing a change in video, which is generated based on the test video signal and displayed on the video display device;

sensing a time required from when a change in type or content of the audio signal is sensed until a change in the video being displayed on the video display device is sensed as a delay time of the video;

calculating an audio delay time that is a time to delay a reproduction of the audio signal, based on the delay time of the video;

writing the audio delay to a memory portion;

sensing a type of the audio signal;

reading a corresponding audio delay time stored in the memory portion based on the type of the audio signal; and executing a reproducing process of the inputted audio signal based on the read audio delay time.

11. The correcting method according to claim 10, wherein an amount of delay to delay the reproduction of the audio signal is controlled by controlling a buffered amount of the audio signal stored in a buffer.

12. The correcting method according to claim 10, further comprising a step of calculating the audio delay time based on the delay time of the video and a decode processing time required for a decoding process of the audio signal.

13. A correcting system for correcting a difference between a processing time of a video signal and a processing time of an audio signal, comprising:

an audio processing portion that executes a reproducing process of the audio signal;

a test video signal generating portion that generating a test video signal;

a video displaying portion that displays the test video signal;

a video sensing portion that senses a change in video, which is generated based on the test video signal and displayed on the video display device; and a controlling portion that senses a time required from when the test video generating portion generates the test video signal until the video sensing portion senses a change in the video being displayed on the video display device as a delay time of the video, and delays a reproduction of the audio signal based on the delay time of the video, wherein the audio processing portion senses a type of the audio signal;

the controlling portion has a memory portion which stores an audio delay time for every type of the audio signal; and the controlling portion reads a corresponding audio delay time stored in the memory portion based on the type of the audio signal and provides the read audio delay time to the audio processing portion.

14. The correcting system according to claim 13, wherein the controlling portion calculates the audio delay time that is a time to delay the audio signal based on the sensed delay time of the video and a decode processing time required for a decoding process of the audio signal, and sets the audio delay time in the audio processing portion.

15. A correcting system for correcting a difference between a processing time of a video signal and a processing time of an audio signal, comprising:

an audio processing portion that executes a reproducing process of the inputted audio signal;

a test audio signal generating portion that generates a test audio signal;

a test video signal generating portion that generates a test video signal in synchronism with a generation of the test audio signal;

a video displaying portion that displays the test video signal;

a video sensing portion that senses a change in video, which is generated based on the test video signal and displayed on the video display device;

a content sensing portion that senses a change in type or content of the test audio signal;

a sensing portion that senses a time required from when the content sensing portion senses the change in type or content of the test audio signal until the video sensing portion senses a change in the video as a delay time of the video;

a calculating portion that calculates an audio delay time that is a time to delay the reproduction of the audio signal, based on the sensed delay time of the video; and a setting portion that sets the audio delay time in the audio processing portion, wherein the audio processing portion senses a type of the audio signal;

the setting portion has a memory portion which stores the audio delay time for every type of the audio signal; and the setting portion reads a corresponding audio delay time stored in the memory portion based on the type of the audio signal and sets the read audio delay time in the audio processing portion.

16. The correcting system according to claim 15, wherein the calculating portion calculates the audio delay time based on the delay time of the video and a decode processing time required for a decoding process of the audio signal.

* * * * *